United States Patent
Burrell et al.

(10) Patent No.: US 7,436,570 B2
(45) Date of Patent: Oct. 14, 2008

(54) ELECTROCHROMIC SALTS, SOLUTIONS, AND DEVICES

(75) Inventors: Anthony K. Burrell, Los Alamos, NM (US); Benjamin P. Warner, Los Alamos, NM (US); T. Mark McClesky, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 238 days.

(21) Appl. No.: 10/996,927

(22) Filed: Nov. 24, 2004

(65) Prior Publication Data

US 2005/0116627 A1     Jun. 2, 2005

Related U.S. Application Data

(62) Division of application No. 10/177,400, filed on Jun. 20, 2002, now Pat. No. 7,064,212.

(51) Int. Cl.
*G02F 1/157* (2006.01)
(52) U.S. Cl. ...................................................... 359/272
(58) Field of Classification Search .................. 359/272
See application file for complete search history.

(56) References Cited

U.S. PATENT DOCUMENTS

| | | | |
|---|---|---|---|
| 3,156,093 | A | 11/1964 | Chapman |
| 3,451,741 | A | 6/1969 | Manos |
| 4,090,782 | A | 5/1978 | Bredfeldt et al. |
| 4,093,358 | A | 6/1978 | Shattuck et al. |
| 4,139,276 | A | 2/1979 | Clecak et al. |
| 4,192,581 | A | 3/1980 | Yaguchi et al. |
| 5,140,455 | A | 8/1992 | Varaprasad et al. |
| 5,239,405 | A | 8/1993 | Varaprasad et al. |
| 5,500,760 | A | 3/1996 | Varaprasad et al. |
| 5,652,072 | A | 7/1997 | Lamanna et al. |
| 5,691,081 | A | 11/1997 | Krause et al. |
| 5,801,873 | A | 9/1998 | Byker |
| 5,827,602 | A | 10/1998 | Koch et al. |
| 5,998,617 | A | 12/1999 | Srinivasa et al. |
| 6,037,471 | A | 3/2000 | Srinivasa et al. |
| 6,141,137 | A | 10/2000 | Byker et al. |
| 6,188,505 | B1 * | 2/2001 | Lomprey et al. ............ 359/265 |
| 6,280,883 | B1 | 8/2001 | Lamanna et al. |
| 6,288,825 | B1 | 9/2001 | Byker et al. |
| 6,388,796 | B1 | 5/2002 | Berneth et al. |

OTHER PUBLICATIONS

Kirk-Othmer, "*Encyclopedia of Chemical Technology*," Fourth Edition, Antibiotics to Batteries, John Wiley & Sons, vol. 3, pp. 1016-1018, pp. 1107-1109.
Kirk-Othmer, "*Encyclopedia of Chemical Technology*," Fourth Edition, Lasers to Mass Spectrometry, John Wiley & Sons, vol. 15, pp. 446-447.
I. F. Chang, "*Electrochromic and Eletrochemichromic Materials and Phenomena*," Nonemissive Electrooptic Displays Ed by A. R. Kmetz and F. R. Von Willison, Plenum Press, New York, 1976.
H. Sun, M. Forsyth, and D. R. MacFarlane, "Room-Temperature Molten Salts Based on the Quaternary Ammonium Ion," J. Phys. Chem. B. vol. 102, pp. 8858-8864, 1998.
Kaori Ito-Akita and Hiroyuki Ohno, "Low Temperature Molten Viologens—Phase Transition and Electrochemical Properties," Proceedings—Electrochemical Society, 2000, vol. 99-41 (Molten Salts XII), pp. 193-201.
Pradip K. Bhomik, Haesook Han, James J. Cebe, and Ivan K. Nedeltchev, "Ambient Temperature Thermotropic Liquid Crystalline Viologens," Polymer Preprints, American Chemical Society, Division of Polymer Chemistry, 2002, vol. 43, No. 2, pp. 1385-1386.
Hajime Matsmoto, Masahiro Yanagida, Kazumi Tanimoto, Katsuhiro Nomura, Yukiko Kitagawa, and Yoshinori Miyazaki, "Wet Type Electrochromic Device Using Cold Molten Electrolytes," Japanese Patent Application Publication 2002-099001, May 4, 2002.

* cited by examiner

*Primary Examiner*—Bernard Dentz
(74) *Attorney, Agent, or Firm*—Samuel L. Borkowsky

(57) ABSTRACT

Electrochromic salts. Electrochromic salts of dicationic viologens such as methyl viologen and benzyl viologen associated with anions selected from bis(trifluoromethylsulfonyl) imide, bis(perfluoroethylsulfonyl)imide, and tris(trifluoromethylsulfonyl)methide are produced by metathesis with the corresponding viologen dihalide. They are highly soluble in molten quaternary ammonium salts and together with a suitable reductant provide electrolyte solutions that are used in electrochromic windows.

10 Claims, 1 Drawing Sheet

ELECTROCHROMIC SALTS, SOLUTIONS, AND DEVICES

RELATED CASES

Figure 1:
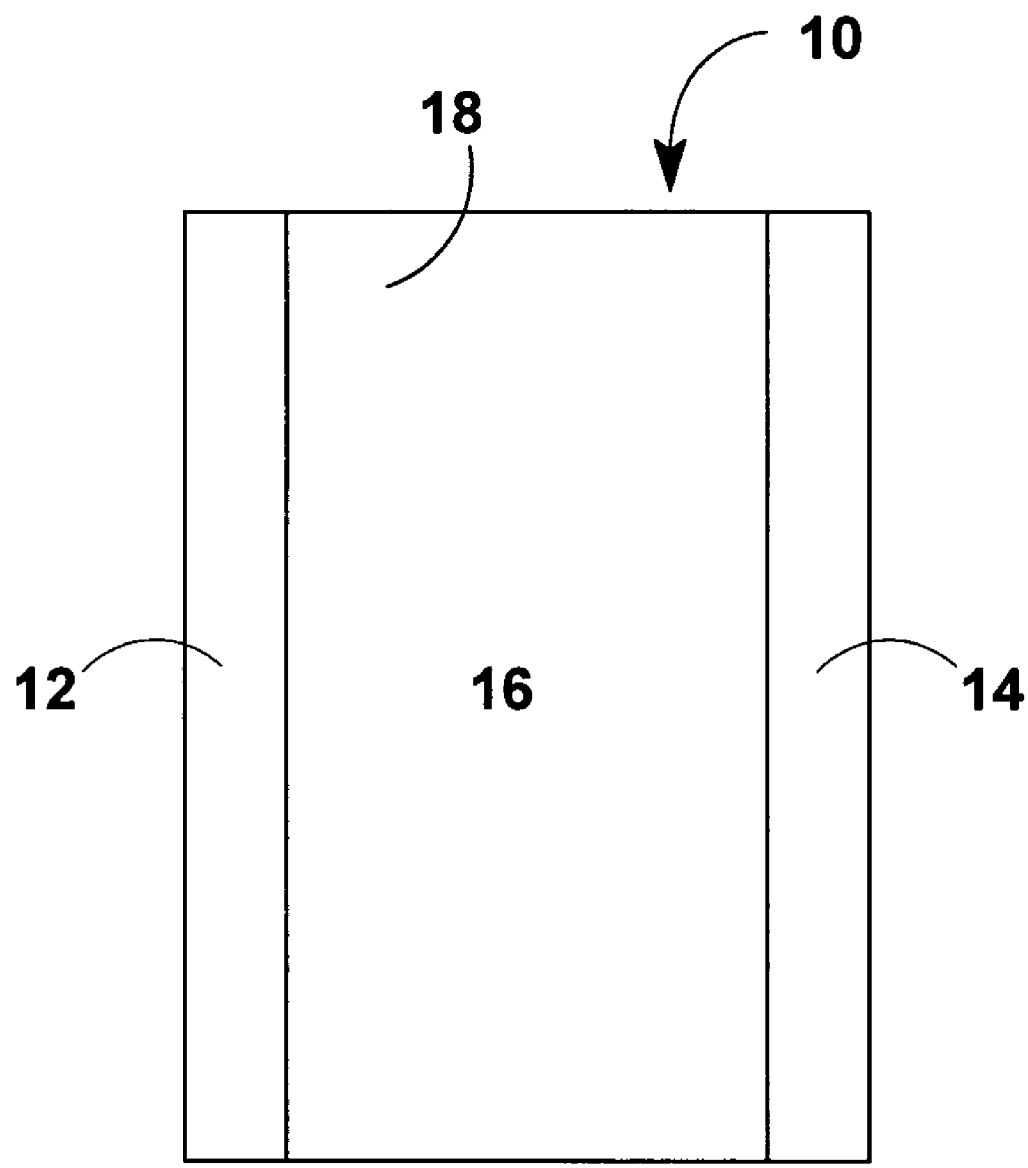

This application is a divisional of U.S. patent application Ser. No. 10/177,400, filed Jun 20, 2002 now U.S. Pat. No. 7,064,212, incorporated by reference herein.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to electrochromic salts and electrolyte solutions prepared using electrochromic salts for electrochromic devices such as electrochromic windows and variable reflectance mirrors.

BACKGROUND OF THE INVENTION

Electrochromism relates to the reversible color change induced in a material by an applied electric potential or current. Materials that exhibit electrochromism are used in electrochromic windows, variable reflectance mirrors, and other types of electrochromic devices.

Electrochromic devices have been described, for example, in U.S. Pat. No. 3,451,741 to Manos; in U.S. Pat. No. 4,090,782 to Bredfeldt et al.; in U.S. Pat. No. 4,093,358 to Shattuck and Sincerbox; and in U.S. Pat. No. 4,139,276 to Clecak et al. An electrochromic device of the type described in these patents generally includes an electrolyte solution of a solvent, a soluble oxidant and a soluble reductant. The device also includes a transparent chamber for the solution and an anode and cathode in contact with the solution. When a DC potential is applied between the anode and the cathode, the reductant is oxidized, the oxidant is reduced, and the solution changes color. The oxidant and reductant react only with each other and when the reaction products do not degrade, the color change can be made reversible.

In recent years, highly conductive electrolyte salts that are molten at room temperature have been developed for electrochromic windows, variable reflectance mirrors, batteries, capacitors, and other important devices. Preferred anions of these "molten salts" include trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). Preferred cations include quarternary ammonium cations (see J. Sun et al., "Room Temperature Molten Salts Based on the Quarternary Ammonium Ion," J. Phys. Chem. B, 1998, vol. 102, pp. 8858-8864, incorporated by reference), lithium (see Kirk-Othmer's Encyclopedia of Chemical Technology, Fourth Edition, 3, 1016-1018 (1992) and 1107-1109; and 15, 446-447 (1995) all incorporated by reference), and phosphonium. Preferred quarternary ammonium salts include tetraalkylammonium, pyridinium, pyridazinium, pyrimidinium, pyrazinium, imidazolium, pyrazolium, thiazolium, oxazolium, and triazolium (see U.S. Pat. No. 5,827,602 to V. R. Koch et al. entitled "Hydrophobic Ionic Liquids," which issued Oct. 27, 1998, incorporated by reference herein).

Commercially available electrochromic windows and mirrors are generally limited to operating temperatures above 0° C. The molten salts described above have a much wider potential window, sometimes greater than 5 Volts, and low glass transition temperatures (some as low as −80° C.) or melting points (some below −20° C.). By replacing these molten salts for currently used solvents (propylene carbonate, for example), the environmental conditions for which electrochromic devices operate would be greatly extended. For these reasons, electrochromic oxidants, electrochromic reductants, and their electrochromic products that are all highly soluble in these molten salts are highly sought after materials.

In recent years, an important class of oxidants from the family of materials known as the viologens has emerged. An example of the dicationic 4,4'-bipyridinium portion of a viologen is shown below.

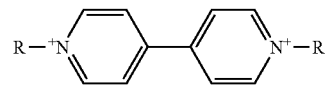

Examples of this viologen are methyl viologen (R=methyl), ethyl viologen (R=ethyl), and benzyl viologen (R=benzyl). These viologens have been isolated as salts of the chloride ($Cl^-$), acetate ($CH_3CO_2^-$) tetraflurorborate ($BF_4^-$), perchlorate ($ClO_4^-$), triflurormethanesulfonate ($CF_3SO_3^-$), tetraphenylborate ($BPh_4^-$), and hexafluorophosphate ($PF_6^-$), to name a few (see, for example, U.S. Pat. No. 5,140,455 to D. V. Varaprasad et al. entitled "High Performance Electrochemichromic Solutions and Devices Thereof," which issued Aug. 19, 1992; U.S. Pat. No. 5,239,405 to D. V. Varaprasad et al. entitled "Electrochemichromic Solutions, Processes for Preparing and Using the Same, and Devices Manufactured With the Same," which issued Aug. 24, 1993; U.S. Pat. No. 5,500,760 to D. V. Varaprasad et al. entitled Electrochemichromic Solutions, Processes for Preparing and Using the Same, and Devices Manufactured With the Same," which issued Mar. 19, 1996; U.S. Pat. No. 5,998,617 to R. Srinvasa et al. entitled "Electrochromic Compounds," which issued Dec. 7, 1999; and U.S. Pat. No. 6,037,471 to R. Srinvasa entitled "Electrochromic Compounds," which issued Mar. 14, 2000, all hereby incorporated by reference). While the viologen salts described in these patents have reportedly been used in combination with molten salts to provide electrolyte solutions for electrochromic devices, at least some of the viologen salts, the dichloride salts or their electrochemically generated reduction products, for example, may have limited solubility in molten salts and/or tend to form precipitates. Anions such as $BF_4^-$ and $PF_6^-$ may be unstable after long periods of time, and $ClO_4^-$ containing salts are known to be unstable. These problems impede the performance of, and affect the lifetime of, the device. Thus, there remains a need for electrochromic salts that are highly soluble in molten salts.

Therefore, an object of the present invention is to provide electrochromic salts that are highly soluble in molten salts.

Another object of the present invention is to provide an electrolyte solution of a molten salt and highly soluble electrochromic salts.

Another object of the present invention is to provide an electrochromic device that employs an electrolyte solution of a molten salt and highly soluble electrochromic salts.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a electrochromic salt having the chemical formula

[A][B]$_2$ wherein B is selected from the group consisting of bis(trifluoromethylsulfonyl)imide, bis(perfluoroethylsulfonyl)imide, and tris(trifluoromethylsulfonyl)methide and wherein A is a dication having the structural formula

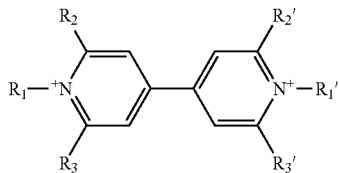

wherein $R_1$ and $R_1'$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
wherein $R_2$, $R_2'$, $R_3$ and $R_3'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

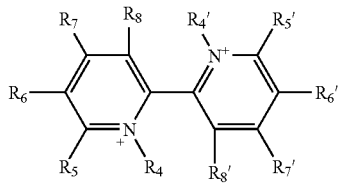

wherein $R_4$ and $R_4'$ are independently selected from alkyl having 1-20 carbons;
wherein $R_5$, $R_5'$, $R_6$, $R_6'$, $R_7$, $R_7'$, $R_8$, and $R_8'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

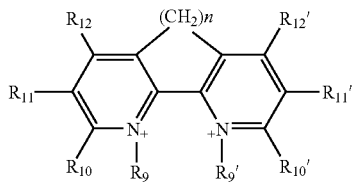

wherein n is 2-7; wherein $R_9$ and $R_9'$ are independently selected from alkyl having 1-20 carbons; wherein $R_{10}$, $R_{10'}$, $R_{11}$, $R_{11'}$, $R_{12}$, and $R_{12'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

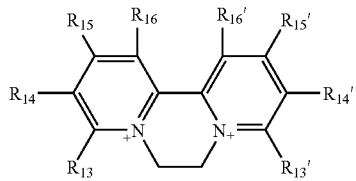

wherein $R_{13}$, $R_{13'}$, $R_{14}$, $R_{14'}$, $R_{15}$, $R_{15'}$, $R_{16}$, and $R_{16'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

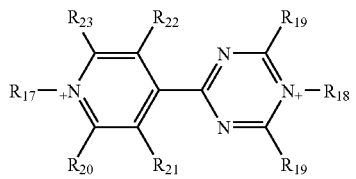

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

The present invention also includes an electrolyte solution for an electrochromic device, comprising a molten salt solvent comprising at least one anion selected from the group consisting of bis(trifluoromethylsulfonyl)imide, bis(perfluoroethylsulfonyl)imide, and tris(trifluoromethylsulfonyl)methide; at least one reductant soluble in said molten salt solvent; and at least one oxidant soluble in said molten salt solvent, said oxidant having the chemical formula [A][B]$_2$ wherein B is selected from the group consisting of bis(trifluoromethylsulfonyl)imide, bis(perfluoroethylsulfonyl)imide, and tris(trifluoromethylsulfonyl)methide and wherein A is a dication having the structural formula

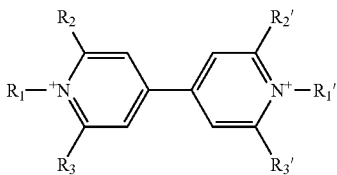

wherein $R_1$ and $R_1'$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein $R_2$, $R_{2'}$, $R_3$ and $R_{3'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

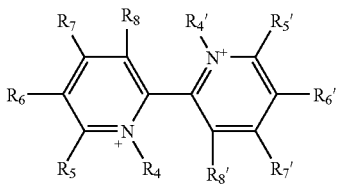

wherein $R_4$ and $R_4'$ are independently selected from alkyl having 1-20 carbons;

wherein $R_5$, $R_{5'}$, $R_6$, $R_{6'}$, $R_7$, $R_{7'}$, $R_8$, and $R_{8'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

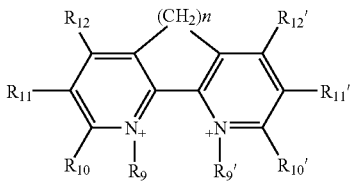

wherein n is 2-7; wherein $R_9$ and $R_{9'}$ are independently selected from alkyl having 1-20 carbons; wherein $R_{10}$, $R_{10'}$, $R_{11}$, $R_{11'}$, $R_{12}$, and $R_{12'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

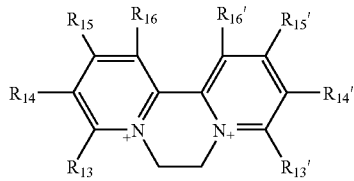

wherein $R_{13}$, $R_{13'}$, $R_{14}$, $R_{14'}$, $R_{15}$, $R_{15'}$, $R_{16}$, and $R_{16'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

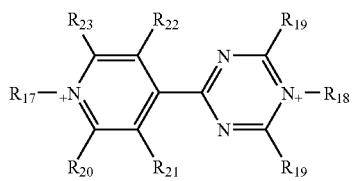

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

The present invention also includes an electrochemical device comprising a chamber for receiving an electrolyte solution; at least one anode in contact with said electrolyte solution in said chamber; at least one cathode in contact with said electrolyte solution in said chamber; and an electrolyte solution comprising comprising a molten salt solvent comprising at least one anion selected from the group consisting of bis(trifluoromethylsulfonyl)imide, bis(perfluoroethylsulfonyl)imide, and tris(trifluoromethylsulfonyl)methide; at least one reductant soluble in said molten salt solvent; and at least one oxidant soluble in said molten salt solvent, said oxidant having the chemical formula [A][B]$_2$ wherein B is selected from the group consisting of bis(trifluoromethylsulfonyl)imide, bis(perfluoroethylsulfonyl)imide, and tris(trifluoromethylsulfonyl)methide and wherein A is a dication having the structural formula

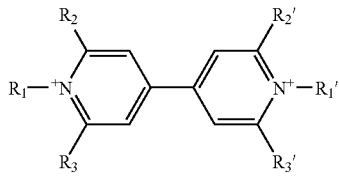

wherein $R_1$ and $R_1'$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein $R_2$, $R_{2'}$, $R_3$ and $R_{3'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

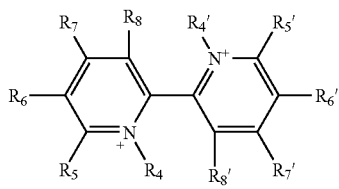

wherein $R_4$ and $R_4'$ are independently selected from alkyl having 1-20 carbons;

wherein $R_5$, $R_{5'}$, $R_6$, $R_{6'}$, $R_7$, $R_{7'}$, $R_8$, and $R_{8'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

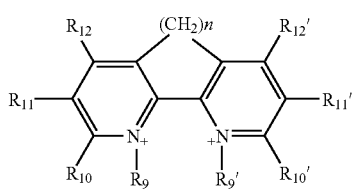

wherein n is 2-7; wherein $R_9$ and $R_{9'}$ are independently selected from alkyl having 1-20 carbons; wherein $R_{10}$, $R_{10'}$, $R_{11}$, $R_{11'}$, $R_{12}$, and $R_{12'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

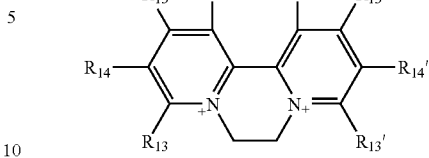

wherein $R_{13}$, $R_{13'}$, $R_{14}$, $R_{14'}$, $R_{15}$, $R_{15'}$, $R_{16}$, and $R_{16'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

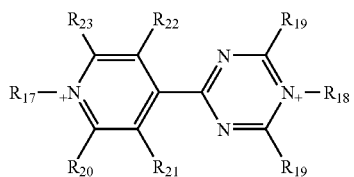

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

The invention also includes an electrolyte solution prepared by dissolving at least one reductant and at least one electrochromic ionic compound, i.e. one electrochromic salt, into a molten salt, said molten comprising an anion selected from the group consisting of bis(trifluoromethylsulfonyl)imide, bis(perfluoroethylsulfonyl)imide, and tris(trifluoromethylsulfonyl)methide, said electrochromic compound having the chemical formula

[A][B]$_2$ wherein B is selected from the group consisting of bis(trifluoromethylsulfonyl)imide, bis(perfluoroethylsulfonyl)imide, and tris(trifluoromethylsulfonyl)methide and wherein A is a dication having the structural formula

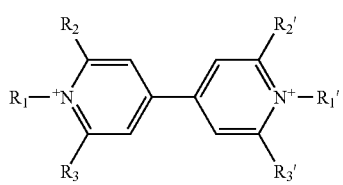

wherein $R_1$ and $R_1{'}$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein $R_2$, $R_2{'}$, $R_3$ and $R_3{'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

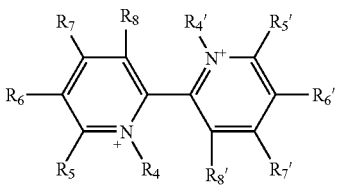

wherein $R_4$ and $R_4{'}$ are independently selected from alkyl having 1-20 carbons;

wherein $R_5$, $R_5{'}$, $R_6$, $R_6{'}$, $R_7$, $R_7{'}$, $R_8$, and $R_8{'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

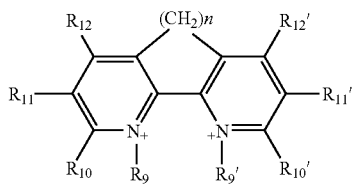

wherein n is 2-7; wherein $R_9$ and $R_9{'}$ are independently selected from alkyl having 1-20 carbons; wherein $R_{10}$, $R_{10}{'}$, $R_{11}$, $R_{11}{'}$, $R_{12}$, and $R_{12}{'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

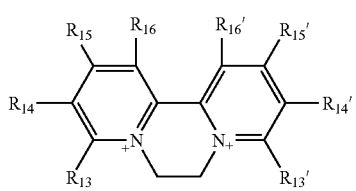

wherein $R_{13}$, $R_{13}{'}$, $R_{14}$, $R_{14}{'}$, $R_{15}$, $R_{15}{'}$, $R_{16}$, and $R_{16}{'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

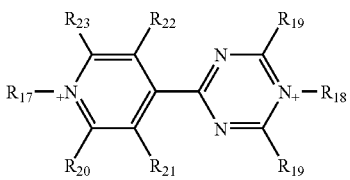

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

DETAILED DESCRIPTION OF THE INVENTION

The present invention includes the present invention includes a electrochromic salt having the chemical formula

[A][B]$_2$ 

wherein B is selected from the group consisting of bis(trifluoromethylsulfonyl)imide, bis(perfluoroethylsulfonyl)imide, and tris(trifluoromethylsulfonyl)methide. Dication A may have the structural formula

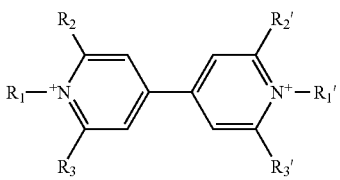

wherein $R_1$ and $R_1{'}$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein $R_2$, $R_2{'}$, $R_3$ and $R_3{'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

Dication A may also have the structural formula

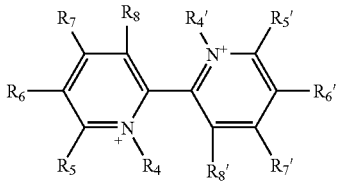

wherein $R_4$ and $R_4'$ are independently selected from alkyl having 1-20 carbons;
wherein $R_5$, $R_5'$, $R_6$, $R_6'$, $R_7$, $R_7'$, $R_8$, and $R_8'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

Dication A may also have the structural formula

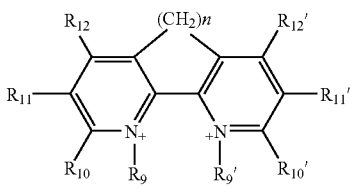

wherein n is 2-7; wherein $R_9$ and $R_9'$ are independently selected from alkyl having 1-20 carbons; wherein $R_{10}$, $R_{10'}$, $R_{11}$, $R_{11'}$, $R_{12}$, and $R_{12'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

Dication A may also have the structural formula

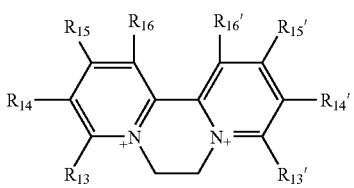

wherein $R_{13}$, $R_{13'}$, $R_{14}$, $R_{14'}$, $R_{15}$, $R_{15'}$, $R_{16}$, and $R_{16'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

Dication A may also have the structural formula

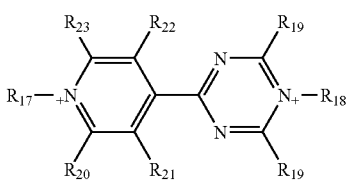

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons.

Preferably, dication A has the structural formula

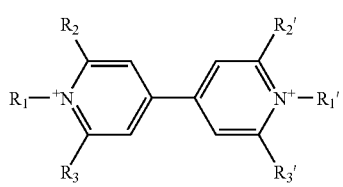

wherein $R_1'$ is alkyl having 1 to 9 carbons or trimethylphenyl or methoxyphenyl and $R_1$ is alkyl having 1 to 9 carbons and $R_2=R_2'=R_3=R_3'=$hydrogen; wherein $R_1=R_1'=$m-xylyl and $R_2=R_2'=R_3=R_3'=$hydrogen; wherein $R_1$ is phenyl and $R_1'$ is alkyl substituted aryl having 18 carbons and $R_2=R_2'=R_3=R_3'=$hydrogen;
wherein $R_1=R_1'=$methyl and $R_2$ is alkyl substituted aryl having 8 or 9 carbons or alkyl having 6 carbons and $R_2'$, $R_3$, and $R_3'$ independently selected from the group consisting of hydrogen, alkyl having from 1 to 9 carbons, and alkyl substituted aryl having from 1 to 9 carbons. More preferably, $R_2=R_2'=R_3=R_3'=$hydrogen and $R_1$ and $R_1$ are independently selected from alkyl having 1-9 carbons, aryl, and alkyl-substituted aryl having 7-20 carbons. Still more preferably, $R_2=R_2'=R_3=R_3'=$hydrogen and $R_1=R_1$ and are selected from the group consisting of alkyl having 1-9 carbons, aryl, and alkyl-substituted aryl having 7-20. Most preferably, $R_2=R_2'=R_3=R_3'=$hydrogen and wherein $R_1=R_1$ and are selected from methyl and benzyl.

Examples of oxidant salts of the invention that include the aforementioned dications and the bis(trifluoromethylsulfonyl)imide anion include:
1,1'-diphenyl-4,4'-dipyridinium bis(bis(trifluoromethylsulfonyl)imide) [1];
1,1'-bis(2,6-dimethylphenyl)-4,4'-dipyridinium bis(bis(trifluoromethylsulfonyl)imide) [2];
1,1'-bis(3,5-dimethylphenyl)-4,4'-dipyridinium bis(bis(trifluoromethylsulfonyl)imide) [3];
1-phenyl-1'-(4-dodecylphenyl)-4,4'-dipyridinium bis(bis(trifluoromethylsulfonyl)imide) [4];
1,1'-bis(2,4,6-trimethylphenyl)-4,4'-dipyridinium bis(bis(trifluoromethylsulfonyl)imide)] [5];
1-(4-cyanophenyl)-1'-methyl-4,4'-dipyridinium bis(bis(trifluoromethylsulfonyl)imide) [6];
1-(3,5-dimethoxyphenyl)-1'-methyl-4,4'-dipyridinium bis(bis(trifluoromethylsulfonyl)imide) [7];
1-methyl-1'-phenyl-4,4'-dipyridinium bis(bis(trifluoromethylsulfonyl)imide) [8];
1-methyl-1'-(2-methylphenyl)-4,4'-dipyridinium bis(bis(trifluoromethylsulfonyl)imide) [9];
1-(4-methoxyphenyl)-1'-methyl-4,4'-dipyridinium bis(bis(trifluoromethylsulfonyl)imide) [10];
1-methyl-1'-(2,4,6-trimethylphenyl)-4,4'-dipyridinium bis(bis(trifluoromethylsulfonyl)imide) [11];

1,2,6-trimethyl-1'-phenyl-4,4'-dipyridinium bis(bis(trifluoromethylsulfonyl)imide) [12];

1,1'-dimethyl-2,6-diphenyl-4,4'-dipyridinium bis(bis(trifluoromethylsulfonyl)imide) [13];

1,1'-bis(3-phenyl(n-propyl))-4,4'-dipyridinium bis(bis(trifluoromethylsulfonyl)imide) [14];

1,1'-dimethyl-4,4'-dipyridinium bis(bis(trifluoromethylsulfonyl)imide) [15];

1,1'-dimethyl-2-(3-phenyl(n-propyl))-4,4'-dipyridinium bis(bis(trifluoromethylsulfonyl)imide) [16];

1,1'-dimethyl-4,4'-(1,3,5-triazine-2,4-diyl)dipyridinium bis(bis(trifluoromethylsulfonyl)imide) [17];

1,1'-dibenzyl-2,2',6,6'-tetramethyl-4,4'-dipyridinium bis(bis(trifluoromethylsulfonyl)imide) [18];

1,1'-ethylene-4,4'-dimethyl-2,2'-dipyridinium bis(bis(trifluoromethylsulfonyl)imide) [19];

1,1'-dimethyl-2,2'-bis(3-phenyl(n-propyl))-4,4'-dipyridiniumbis(bis(trifluoromethylsulfonyl)imide) [20];

6,7dihydrodipyrido-[1,2a:1c]pyrazinediium bis(bis(trifluoromethylsulfonyl)imide) [21]

1,1',2,2',3,3',4,4'-octahydro-8,8'-biquinolizinium bis(bis(trifluoromethylsulfonyl)imide) [22];

1,1',2-trimethyl-2',6,6'-tris(2-phenylethyl)-4,4'-dipyridiniumbis(bis(trifluoromethylsulfonyl)imide) [23];

1-methyl-4-(1,3,5-triazine-2-yl)-pyridinium bis(trifluoromethylsulfonyl)imide [24]

1,1',2,2',6-pentamethyl-6'-n-hexyl-4,4'-dipyridinium bis(bis(trifluoromethylsulfonyl)imide) [25];

1,1',2,2'-tetramethyl-6,6'-bis-n-hexyl-4,4'-dipyridinium bis(bis(trifluoromethylsulfonyl)imide) [26];

1,1',2,2',6-pentamethyl-6'-(3-phenyl(n-propyl))-dipyridiniumbis(bis(trifluoromethylsulfonyl)imide) [27]; and 1,1'-dibenzyl-4,4'-dipyridinium bis(bis(trifluoromethylsulfonyl)imide) [28].

Examples of salts of the invention that include the bis(fluoroethylsulfonyl)imide anion include:

1,1'-diphenyl-4,4'-dipyridinium bis(bis(perfluoroethylsulfonyl)imide) [29];

1,1'-bis(2,6-dimethylphenyl)-4,4'-dipyridinium bis(bis(perfluoroethylsulfonyl)imide) [30];

1,1'-bis(3,5-dimethylphenyl)-4,4'-dipyridinium bis(bis(perfluoroethylsulfonyl)imide) [31];

1-phenyl-1'-(4-dodecylphenyl)-4,4'-dipyridinium bis(bis(perfluoroethylsulfonyl)imide [32];

1,1'-bis(2,4,6-trimethylphenyl)-4,4'-dipyridinium bis(bis(perfluoroethylsulfonyl)imide) [33];

1-(4-cyanophenyl)-1'-methyl-4,4'-dipyridinium bis(bis(perfluoroethylsulfonyl)imide) [34];

1-(3,5-dimethoxyphenyl)-1'-methyl-4,4'-dipyridinium bis(bis(perfluoroethylsulfonyl)imide) [35];

1-methyl-1'-phenyl-4,4'-dipyridinium bis(bis(perfluoroethylsulfonyl)imide) [36];

1-methyl-1'-(2-methylphenyl)-4,4'-dipyridinium bis(bis(perfluoroethylsulfonyl)imide) [37];

1-(4-methoxyphenyl)-1'-methyl-4,4'-dipyridinium bis(bis(perfluoroethylsulfonyl)imide) [38];

1-methyl-1'-(2,4,6-trimethylphenyl)-4,4'-dipyridinium bis(bis(perfluoroethylsulfonyl)imide) [39];

1,2,6-trimethyl-1'-phenyl-4,4'-dipyridinium bis(bis(perfluoroethylsulfonyl)imide) [40];

1,1'-dimethyl-2,6-diphenyl-4,4'-dipyridinium bis(bis(perfluoroethylsulfonyl)imide) [41];

1,1'-bis(3-phenyl(n-propyl))-4,4'-dipyridinium bis(bis(perfluoroethylsulfonyl)imide) [42];

1,1'-dimethyl-4,4'-dipyridinium bis(bis(perfluoroethylsulfonyl)imide) [43];

1,1'-dimethyl-2-(3-phenyl(n-propyl))-4,4'-dipyridinium bis(bis(perfluoroethylsulfonyl)imide) [44];

1,1'-dimethyl-4,4'-(1,3,5-triazine-2,4-diyl)dipyridinium bis(bis(perfluoroethylsulfonyl)imide) [45];

1,1'-dibenzyl-2,2',6,6'-tetramethyl-4,4'-dipyridinium bis(bis(perfluoroethylsulfonyl)imide) [46];

1,1'-ethylene-4,4'-dimethyl-2,2'-dipyridinium bis(bis(perfluoroethylsulfonyl)imide) [47];

1,1'-dimethyl-2,2'-bis(3-phenyl(n-propyl))-4,4'-dipyridiniumbis(bis(perfluoroethylsulfonyl)imide) [48];

6,7dihydrodipyrido-[1,2a:1c]pyrazinediium bis(bis(perfluoroethylsulfonyl)imide) [49];

1,1',2,2',3,3',4,4'-octahydro-8,8'-biquinolizinium bis(bis(perfluoroethylsulfonyl)imide) [50];

1,1',2-trimethyl-2',6,6'-tris(2-phenylethyl)-4,4'-dipyridiniumbis(bis(perfluoroethylsulfonyl)imide) [51];

1-methyl-4-(1,3,5-triazine-2-yl)-pyridinium bis(perfluoroethylsulfonyl)imide [52];

1,1',2,2',6-pentamethyl-6'-n-hexyl-4,4'-dipyridinium bis(bis(perfluoroethylsulfonyl)imide) [53];

1,1',2,2'-tetramethyl-6,6'-bis-n-hexyl-4,4'-dipyridinium bis(bis(perfluoroethylsulfonyl)imide) [54];

1,1',2,2',6-pentamethyl-6'-(3-phenyl(n-propyl))-dipyridiniumbis(bis(perfluoroethylsulfonyl)imide) [55]; and 1,1'-dibenzyl-4,4'-dipyridinium bis(bis(trifluoromethylsulfonyl)imide) [56].

Examples of salts of the invention that include the bis(tris(trifluoromethylsulfonyl)methide anion include:

1,1'-diphenyl-4,4'-dipyridinium bis(tris(trifluoromethylsulfonyl)methide) [57];

1,1'-bis(2,6-dimethylphenyl)-4,4'-dipyridinium bis(tris(trifluoromethylsulfonyl)methide) [58];

1,1'-bis(3,5-dimethylphenyl)-4,4'-dipyridinium bis(tris(trifluoromethylsulfonyl)methide) [59];

1-phenyl-1'-(4-dodecylphenyl)-4,4'-dipyridinium bis(tris(trifluoromethylsulfonyl)methide) [60];

1,1'-bis(2,4,6-trimethylphenyl)-4,4'-dipyridinium bis(tris(trifluoromethylsulfonyl)methide) [61];

1-(4-cyanophenyl)-1'-methyl-4,4'-dipyridinium bis(tris(trifluoromethylsulfonyl)methide) [62];

1-(3,5-dimethoxyphenyl)-1'-methyl-4,4'-dipyridinium bis(tris(trifluoromethylsulfonyl)methide) [63];

1-methyl-1'-phenyl-4,4'-dipyridinium bis(tris(trifluoromethylsulfonyl)methide) [64];

1-methyl-1'-(2-methylphenyl)-4,4'-dipyridinium bis(tris(trifluoromethylsulfonyl)methide) [65];

1-(4-methoxyphenyl)-1'-methyl-4,4'-dipyridinium bis(tris(trifluoromethylsulfonyl)methide) [66];

1-methyl-1'-(2,4,6-trimethylphenyl)-4,4'-dipyridinium bis(tris(trifluoromethylsulfonyl)methide) [67];

1,2,6-trimethyl-1'-phenyl-4,4'-dipyridinium bis(tris(trifluoromethylsulfonyl)methide) [68];

1,1'-dimethyl-2,6-diphenyl-4,4'-dipyridinium bis(tris(trifluoromethylsulfonyl)methide) [69];

1,1'-bis(3-phenyl(n-propyl))-4,4'-dipyridinium bis(tris(trifluoromethylsulfonyl)methide) [70]

1,1'-dimethyl-4,4'-dipyridinium bis(tris(trifluoromethylsulfonyl)methide) [71];

1,1'-dimethyl-2-(3-phenyl(n-propyl))-4,4'-dipyridinium bis(tris(trifluoromethylsulfonyl)methide) [72];

1,1'-dimethyl-4,4'-(1,3,5-triazine-2,4-diyl)dipyridinium bis(tris(trifluoromethylsulfonyl)methide) [73];

1,1'-dibenzyl-2,2',6,6'-tetramethyl-4,4'-dipyridinium bis(tris(trifluoromethylsulfonyl)methide) [74];

1,1'-ethylene-4,4'-dimethyl-2,2'-dipyridinium bis(tris(trifluoromethylsulfonyl)methide) [75];

1,1'-dimethyl-2,2'-bis(3-phenyl(n-propyl))-4,4'-dipyridini-umbis(tris(trifluoromethylsulfonyl)methide) [76];
6,7dihydrodipyrido-[1,2a:1c]pyrazinediium bis(tris(trifluoromethylsulfonyl)methide) [77];
1,1',2,2',3,3',4,4'-octahydro-8,8'-biquinolizinium bis(tris(trifluoromethylsulfonyl)methide) [78];
1,1',2-trimethyl-2',6,6'-tris(2-phenylethyl)-4,4'-dipyridini-umbis(tris(trifluoromethylsulfonyl)methide) [79];
1-methyl-4-(1,3,5-triazine-2-yl)-pyridinium tris(trifluoromethylsulfonyl)methide [80];
1,1',2,2',6-pentamethyl-6'-n-hexyl-4,4'-dipyridinium bis(tris(trifluoromethylsulfonyl)methide) [81];
1,1',2,2'-tetramethyl-6,6'-bis-n-hexyl-4,4'-dipyridinium bis(tris(trifluoromethylsulfonyl)methide) [82];
1,1',2,2',6-pentamethyl-6'-(3-phenyl(n-propyl))-dipyridini-umbis(tris(trifluoromethylsulfonyl)methide) [83]; and
1,1'-dibenzyl-4,4'-dipyridinium bis(bis(trifluoromethylsulfonyl)imide) [84].

Compounds 1-28 may be prepared by reacting the appropriate bispyridinium dichloride or pyridinium-tetrazinium dichloride with a reactive salt of the bis(trifluoromethylsulfonyl)imide anion. Compounds 28-56 may be prepared by reacting the appropriate bispyridinium dichloride or pyridinium-tetrazinium dichloride with a reactive salt of the bis(perfluoroethylsulfonyl)imide anion. Compounds 57-84 may be prepared by reacting the appropriate bispyridinium dichloride or pyridinium-tetrazinium dichloride with a reactive salt of the tris(trifluoromethylsulfonyl)methide anion.

Directions for preparing the precursor dichloride compounds for salts [1]-[84] are found in U.S. Pat. No. 6,037,471 to R. Srinivasa et al. entitled "Electrochromic Compounds," hereby incorporated by reference. The '471 patent also includes directions for converting at least some of the dichloride compounds into the corresponding tetrafluoroborate, hexafluorophosphate, and perchlorate salts.

Lithium salts of the bis(trifluoromethylsulfonyl)imide anion have been described by William M. Lamanna et al. in U.S. Pat. No. 6,280,883 entitled "Bis(perfluoroalkanesulfonyl)imide Surfactant Salts in Electrochemical Systems". Other salt include, $Na^+$, 1-ethyl,3-methyl-imidazolium, tetraalkylammonium, and the like, which are very difficult to oxidize. The tetraalkylammonium salts have a potential window of about 6 eV, a low viscosity, a high conductance, and a lower freezing point than many commonly used electrolyte solutions. These salts are molten at room temperature, and are used as solvent electrolytes for electrochemical devices.

The present invention also includes an electrolyte solution for an electrochromic device. The solution of the invention includes a molten salt solvent having at least one anion selected from bis(trifluoromethylsulfonyl)imide, bis(perfluoroethylsulfonyl)imide, and tris(trifluoromethylsulfonyl) methide. The solution also includes at least one reductant soluble in the molten salt solvent and at least one soluble oxidant having the chemical formula $[A][B]_2$
wherein B is selected from bis(trifluoromethylsulfonyl)imide, bis(perfluoroethylsulfonyl)imide, and tris(trifluoromethylsulfonyl)methide and
wherein A is a dication having the structural formula

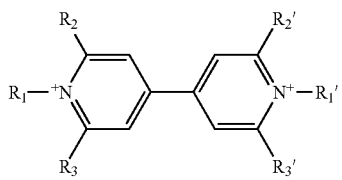

wherein $R_1$ and $R_1'$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
wherein $R_2$, $R_2'$, $R_3$ and $R_3'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

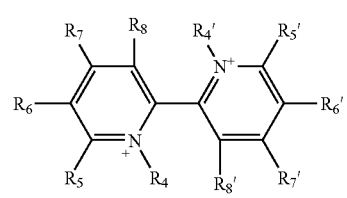

wherein $R_4$ and $R_4'$ are independently selected from alkyl having 1-20 carbons;
wherein $R_5$, $R_5'$, $R_6$, $R_6'$, $R_7$, $R_7'$, $R_8$, and $R_8'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

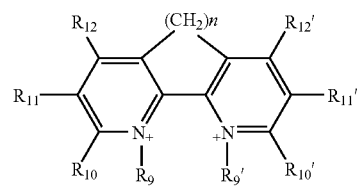

wherein n is 2-7; wherein $R_9$ and $R_{9'}$ are independently selected from alkyl having 1-20 carbons; wherein $R_{10}$, $R_{10'}$, $R_{11}$, $R_{11'}$, $R_{12}$, and $R_{12'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

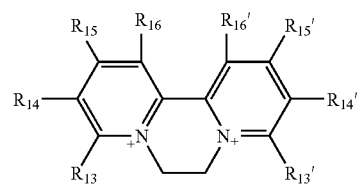

wherein $R_{13}$, $R_{13'}$, $R_{14}$, $R_{14'}$, $R_{15}$, $R_{15'}$, $R_{16}$, and $R_{16'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;
or wherein A is a dication having the structural formula

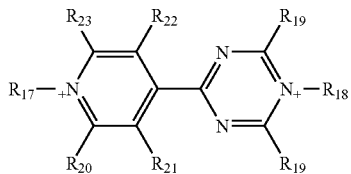

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons. Preferably, dication A has the structural formula

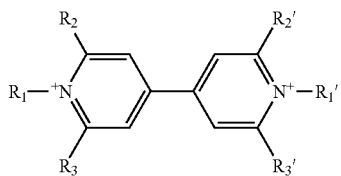

wherein $R_1'$ is alkyl having 1 to 9 carbons or trimethylphenyl or methoxyphenyl and $R_1$ is alkyl having 1 to 9 carbons and $R_2=R_2'=R_3=R_3'$=hydrogen; wherein $R_1=R_1'$=m-xylyl and $R_2=R_2'=R_3=R_3'$=hydrogen; wherein $R_1$ is phenyl and $R_1'$ is alkyl substituted aryl having 18 carbons and $R_2=R_2'=R_3=R_3'$=hydrogen;
wherein $R_1=R_1'$=methyl and $R_2$ is alkyl substituted aryl having 8 or 9 carbons or alkyl having 6 carbons and $R_2'$, $R_3$, and $R_3'$ independently selected from the group consisting of hydrogen, alkyl having from 1 to 9 carbons, and alkyl substituted aryl having from 1 to 9 carbons. More preferably, $R_2=R_2'=R_3=R_3'$=hydrogen and $R_1$ and $R_1'$ are independently selected from alkyl having 1-9 carbons, aryl, and alkyl-substituted aryl having 7-20 carbons. Still more preferably, $R_2=R_2'=R_3=R_3'$=hydrogen and $R_1=R_1'$ and are selected from the group consisting of alkyl having 1-9 carbons, aryl, and alkyl-substituted aryl having 7-20. Most preferably, $R_2=R_2'=R_3=R_3'$=hydrogen and wherein $R_1=R_1'$ and are selected from methyl and benzyl.

A wide variety of reductants may be used with the invention. These may include, but are not limited to, N,N,N',N'-tetramethyl-p-phenylenediamine, 2,5,10-trimethyl-3-phenyl-5,10-dihydrophenazine, 5-ethyl-10-methyl-5,10-dihydrophenazine, 5,10-dimethyl-5,10-dihydrobenzo(A) phenazine, 2,7-diphenoxy-5,10-dimethyl-5,10-dihydrophenazine, 2-phenoxy-5,10-dimethyl-5,10-dihydrophenazine, 2,7-bis(o-tolyl)-5,10-dimethyl-5,10-dihydrophenazine, 2,3-dimethyl-7-trifluoromethyl-5,10-diethyl-5,10-dihydrophenazine, 5,10-dimethyl-5,10-dihydrophenazine, 2,3-diphenyl-5,10-dimethyl-5,10-dihydrophenazine, 2,7-diphenyl-5,10-dimethyl-5,10-dihydrophenazine, 2-vinyl-5,10-dimethyl-5,10-dihydrophenazine, 2-phenyl-5,10-dimethyl-5,10-dihydrophenazine, 5,10-diisopropyl-5,10-dihydrophenazine, 5,10-dimethyl-5,10-dihydrodibenzo(A, C)phenazine, 1,5,10-trimethyl-2-phenyl-5,10-dihydrophenazin, 2,3,5,10-tetramethyl-7-trifluoromethyl-5, 10-dihydrophenazine, 2,3,5,10-tetramethyl-5,10-dihydrobenzo(B)phenazine, ferrocene, 1,1'-dimethylferrocene, and decamethylferrocene. All of these reductants will react with the viologen salts of the invention to form soluble anions.

Preferably, the electrolyte solution does not include anions such as chloride, bromide, iodide, perchlorate, tetrafluoroborate, tetraphenylborate, carboxylate, carbonate, hexafluorophosphate, or hexafluoroantimonate anions. These anions could be present if viologens other than those of the present invention were used to prepare an electrolyte solution. At least some of these anions present problems that are avoided by the invention. Viologen chloride, for example, could have limited solubility in molten salts and form precipitates. The invention avoids these problems.

The electrochromic salts of the invention are extremely soluble in molten salts, especially in a molten salt having the same anion as the corresponding electrochromic salt.

A wide variety of molten salts can be used in the electrolyte solution of the invention. Preferably, these molten salts include the trifluoromethylsulfonate ($CF_3SO_3^-$), bis(trifluoromethylsulfonyl)imide ($(CF_3SO_2)_2N^-$), bis(perfluoroethylsulfonyl)imide ($(CF_3CF_2SO_2)_2N^-$) and tris(trifluoromethylsulfonyl)methide ($(CF_3SO_2)_3C^-$). Preferred cations of these molten salts include the quarternary ammonium cations described in J. Sun et al., "Room Temperature Molten Salts Based on the Quarternary Ammonium Ion," J. Phys. Chem. B, 1998, vol. 102, pp. 8858-8864, previously incorporated by reference, and the quarternary ammonium cations described in U.S. Pat. No. 5,827,602 to V. R. Koch et al. entitled "Hydrophobic Ionic Liquids,"). Preferred cations include, but are not limited to, pyridinium, pyridazinium, pyrimidinium, pyrazinium, imidazolium, pyrazolium, thiazolium, oxazolium, and triazolium. Most preferred cations are quarternary ammonium cations having the formula $(CH_3CH_2)_3N(R_{24})$, wherein $R_{24}$ is alkyl having 2-10 carbons; or having the formula $(CH_3)_2(CH_3CHCH_3)N(R_{25})$, wherein $R_{25}$ is alkyl having 2-10 carbons; or having the structural formula

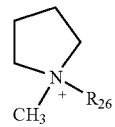

wherein $R_{26}$ is alkyl having 2-10 carbons;
or having the structural formula

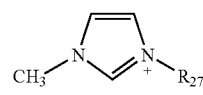

wherein $R_{27}$ is alkyl having 2-10 carbons.

BRIEF DESCRIPTION THE DRAWING

The present invention also includes an electrochemical device. A schematic representation of the device is shown in FIG. 1. Device 10 includes anode 12, cathode 14, chamber 16 containing electrolyte solution 18. Anode 12 and cathode 14 are in contact with solution 18, which includes a molten salt solvent having at least one anion selected from bis(trifluoromethylsulfonyl)imide, bis(perfluoroethylsulfonyl)imide, and tris(trifluoromethylsulfonyl)methide. The electrolyte solution also includes at least one soluble reductant soluble in the molten salt solvent, and at least one soluble oxidant. The soluble oxidant is one of the aforementioned electrochromic salts having the formula [A][B]$_2$ wherein B is selected from bis(trifluoromethylsulfonyl)imide, bis(perfluoroethylsulfonyl)imide, and tris(trifluoromethylsulfonyl)methide and wherein A is a dication having the structural formula

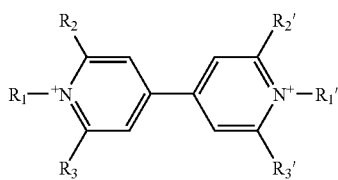

wherein $R_1$ and $R_1'$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein $R_2$, $R_2'$, $R_3$ and $R_3'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

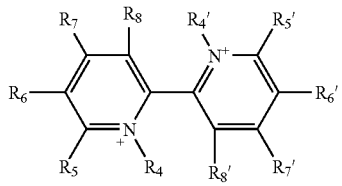

wherein $R_4$ and $R_4'$ are independently selected from alkyl having 1-20 carbons;

wherein $R_5$, $R_5'$, $R_6$, $R_6'$, $R_7$, $R_7'$, $R_8$, and $R_8'$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

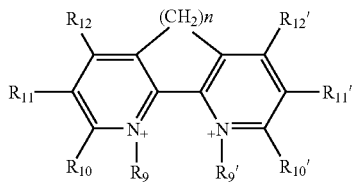

wherein n is 2-7; wherein $R_9$ and $R_9'$ are independently selected from alkyl having 1-20 carbons; wherein $R_{10}$, $R_{10'}$, $R_{11}$, $R_{11'}$, $R_{12}$, and $R_{12'}$ independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

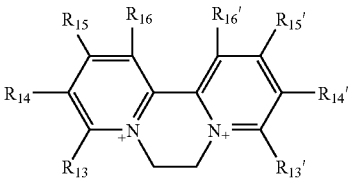

wherein $R_{13}$, $R_{13'}$, $R_{14}$, $R_{14'}$, $R_{15}$, $R_{15'}$, $R_{16}$, and $R_{16'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

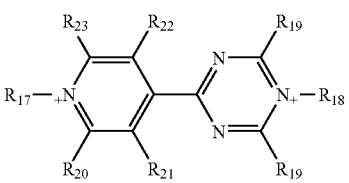

wherein $R_{17}$ and $R_{18}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons; wherein $R_{19}$, $R_{20}$, $R_{21}$, $R_{22}$, and $R_{23}$ are independently selected from alkyl having 1-20 carbons, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons. Preferably, dication A has the structural formula

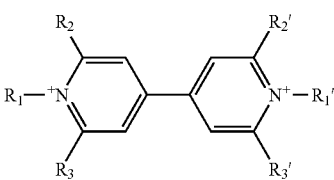

wherein $R_1'$ is alkyl having 1 to 9 carbons or trimethylphenyl or methoxyphenyl and $R_1$ is alkyl having 1 to 9 carbons and $R_2=R_2'=R_3=R_3'=$hydrogen; wherein $R_1=R_1'=$m-xylyl and $R_2=R_2'=R_3=R_3'=$hydrogen; wherein $R_1$ is phenyl and $R_1'$ is alkyl substituted aryl having 18 carbons and $R_2=R_2'=R_3=R_3'=$hydrogen;

wherein $R_1=R_1'$=methyl and $R_2$ is alkyl substituted aryl having 8 or 9 carbons or alkyl having 6 carbons and $R_2'$, $R_3$, and $R_3'$ independently selected from the group consisting of hydrogen, alkyl having from 1 to 9 carbons, and alkyl substituted aryl having from 1 to 9 carbons. More preferably, $R_2=R_2'=R_3=R_3'$=hydrogen and $R_1$ and $R_1'$ are independently selected from alkyl having 1-9 carbons, aryl, and alkyl-substituted aryl having 7-20 carbons. Still more preferably, $R_2=R_2'=R_3=R_3'$=hydrogen and $R_1=R_1'$ and are selected from the group consisting of alkyl having 1-9 carbons, aryl, and alkyl-substituted aryl having 7-20. Most preferably, $R_2=R_2'=R_3=R_3'$=hydrogen and wherein $R_1=R_1'$ and are selected from methyl and benzyl.

A wide variety of reductants may be used with the electrochemical device of the invention. These may include, but are not limited to, N,N,N',N'-tetramethyl-p-phenylenediamine, 2,5,10-trimethyl-3-phenyl-5,10-dihydrophenazine, 5-ethyl-10-methyl-5,10-dihydrophenazine, 5,10-dimethyl-5,10-dihydrobenzo(A)phenazine, 2,7-diphenoxy-5,10-dimethyl-5,10-dihydrophenazine, 2-phenoxy-5,10-dimethyl-5,10-dihydrophenazine, 2,7-bis(o-tolyl)-5,10-dimethyl-5,10-dihydrophenazine, 2,3-dimethyl-7-trifluoromethyl-5,10-diethyl-5,10-dihydrophenazine, 5,10-dimethyl-5,10-dihydrophenazine, 2,3-diphenyl-5,10-dimethyl-5,10-dihydrophenazine, 2,7-diphenyl-5,10-dimethyl-5,10-dihydrophenazine, 2-vinyl-5,10-dimethyl-5,10-dihydrophenazine, 2-phenyl-5,10-dimethyl-5,10-dihydrophenazine, 5,10-diisopropyl-5,10-dihydrophenazine, 5,10-dimethyl-5,10-dihydrodibenzo(A,C)phenazine, 1,5,10-trimethyl-2-phenyl-5,10-dihydrophenazin, 2,3,5,10-tetramethyl-7-trifluoromethyl-5,10-dihydrophenazine, 2,3,5,10-tetramethyl-5,10-dihydrobenzo(B)phenazine, ferrocene, 1,1'-dimethylferrocene, and decamethylferrocene. All of these reductants will react with the viologen salts of the invention to form species that remain soluble.

Preferably, the electrolyte solution used with the device of the invention does not include anions such as chloride, bromide, iodide, perchlorate, tetrafluoroborate, tetraphenylborate, carboxylate, carbonate, hexafluorophosphate, or hexafluoroantimonate anions. These anions could be present if viologens other than those of the present invention were used to prepare an electrolyte solution. The present invention avoids these anions. Viologen chloride, for example, could have limited solubility in molten salts and form precipitates. The viologens of the present invention do not contain chloride anion, which is potentially corrosive to electrodes. The electrolyte solution used with the device of the present invention do not contain chloride anion and avoid this problem. The electrochromic salts of the invention are extremely soluble in molten salts, especially in a molten salt having the same anion as the corresponding electrochromic salt.

A wide variety of molten salts can be used in the electrolyte solution of the device of invention. Preferably, these molten salts include the trifluoromethylsulfonate ($CF_3SO_3^-$), bis(trifluoromethylsulfonyl)imide (($CF_3SO_2)_2N^-$), bis(perfluoroethylsulfonyl)imide (($CF_3CF_2SO_2)_2N^-$) and tris(trifluoromethylsulfonyl)methide (($CF_3SO_2)_3C^-$). Preferred cations of these molten salts include the quarternary ammonium cations described in J. Sun et al., "Room Temperature Molten Salts Based on the Quarternary Ammonium Ion," J. Phys. Chem. B, 1998, vol. 102, pp. 8858-8864, previously incorporated by reference, and the quarternary ammonium cations described in U.S. Pat. No. 5,827,602 to V. R. Koch et al. entitled "Hydrophobic Ionic Liquids,"). Preferred cations include, but are not limited to, pyridinium, pyridazinium, pyrimidinium, pyrazinium, imidazolium, pyrazolium, thiazolium, oxazolium, and triazolium. Most preferred cations are quarternary ammonium cations having the formula ($CH_3CH_2)_3N(R_{24})$, wherein $R_{24}$ is alkyl having 2-10 carbons; or having the formula ($CH_3)_2(CH_3CHCH_3)N(R_{25})$, wherein $R_{25}$ is alkyl having 2-10 carbons; or having the structural formula

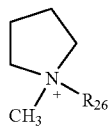

wherein $R_{26}$ is alkyl having 2-10 carbons; or having the structural formula

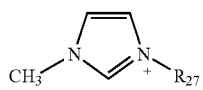

wherein $R_{27}$ is alkyl having 2-10 carbons.

A wide variety of anodes and cathodes may be used with the device of the invention. Electrodes of Indium-Tin oxide, for example, were used in preparing examples of electrochromic windows of the invention. The following examples describe the preparation of electrochromic salts, electrolyte solutions, and electrochromic devices (windows) of the invention.

EXAMPLE 1

Preparation of 1,1'-dimethyl-4,4'-dipyridinium bis(bis(trifluoromethylsulfonyl)imide) [15]. A first solution of 1,1'-dimethyl-4,4'-dipyridinium dichloride (1.128 g in 10 mL distilled $H_2O$) was prepared. A second solution of lithium bis(trifluoromethylsulfonyl)imide (LiNTf$_2$) (1.264 g in 10 mL distilled $H_2O$) was prepared and slowly added via pipette to the first solution with stirring. Salt 15 formed as a white solid. The mixture was filtered, and the solid white powder MeV (NTf)$_2$ formed. The solution was filtered and the solid was dissolved in acetone. The acetone was removed under a vacuum to produce 15 as a white powder.

EXAMPLE 2

Preparation of a solution of the radical cation of [15]. An electrolyte solution of about 0.011 g of 15 (prepared according to Example 1) in about 1.0 mL 1-butyl-3-methylimidazolium bis(trifluoromethylsulfonyl)imide was prepared under an inert atmosphere of helium. A chamber for the solution was provided by compressing a 0.5 inch diameter o-ring in between two 0.5-inch diameter conducting indium tin oxide (ITO) electrodes. The electrolyte solution was injected into the chamber through the o-ring.

The electrodes were connected to an HCH instruments Model 730A Electrochemical Analyzer. Bulk electrolysis of the solution at the reducing potential of −0.5V, which was indicated by the first peak of the cathodic wave, produced a blue color for the solution within about 5 seconds.

EXAMPLE 3

Preparation of an electrochromic window using [15]. An electrolyte solution of about 0.022 g of 15 and about 0.0050 g N,N,N,N-tetramethyl-p-phenylenediamine in about 2.0 mL 1-butyl-3-methylimidazolium bis(trifluoromethylsulfonyl) imide was prepared under an inert atmosphere of helium. A chamber for the solution was provided by compressing a 0.5 inch diameter o-ring in between two 0.5-inch diameter conducting indium tin oxide (ITO) electrodes. The solution was injected into the chamber through the o-ring to provide an electrochromic window.

The electrodes of the window were connected to an HCH instruments Model 730A Electrochemical Analyzer. Bulk electrolysis of the solution at the reducing potential of −0.5V (indicated by the first peak of the cathodic wave) produced a blue color within about 5 seconds.

EXAMPLE 4

Preparation of 1,1'-dibenzyl-4,4'-dipyridinium bis(bis(trifluoromethylsulfonyl)imide) [28]. A first solution of 1,1'-dibenzyl-4,4'-dipyridinium dichloride (1.795 g) in 10 mL distilled $H_2O$ was prepared. A second solution of lithium bis(trifluoromethylsulfonyl)imide (LiNTf$_2$, 1.264 g) in 10 mL distilled $H_2O$ was prepared and added slowly by pipette to the first solution with stirring. Salt 28 formed as a white solid. The mixture was filtered, the white solid was collected and dissolved in acetone. The acetone was removed under a vacuum to produce 28 as a white powder.

EXAMPLE 5

Preparation of a solution of the radical cation of [28]. An electrolyte solution of 28 (about 0.013 g, prepared as described in Example 4), in about 1.0 mL 1-butyl-3-methylimidazolium bis(trifluoromethylsulfonyl)imide was prepared under an inert atmosphere of helium gas. A chamber for the solution was provided by compressing a 0.5 inch diameter o-ring in between two 0.5-inch diameter conducting indium tin oxide (ITO) electrodes. The electrolyte solution was injected into the chamber through the o-ring. The electrodes were connected to an HCH instruments Model 730A Electrochemical Analyzer. Bulk electrolysis of the solution at the reducing potential of −1.0V, which was indicated by the first peak of the cathodic wave, produced a blue color for the solution within 5 seconds.

In summary, the invention includes electrochromic salts, electrolyte solutions employing these salts, and electrochromic devices employing these electrolyte solutions. The salts are viologen salts having the bis(trifluoromethylsulfonyl)imide, bis(perfluoroethylsulfonyl)imide, and tris(trifluoromethylsulfonyl)methide anions. Examples of these salts have been prepared and isolated as powders. They are highly soluble in molten salts and together with a reductant provide electrolyte solutions that may be in electrochromic devices such as windows and variable reflectance mirrors.

The foregoing description of the invention has been presented for purposes of illustration and description and is not intended to be exhaustive or to limit the invention to the precise form disclosed, and obviously many modifications and variations are possible in light of the above teaching. Commercially available autofocus laser end effectors, for example, could be used instead of the laser end effectors described herein.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrochemical device comprising:
   (a) a chamber for receiving an electrolyte solution;
   (b) at least one anode in contact with said electrolyte solution in said chamber;
   (c) at least one cathode in contact with said electrolyte solution in said chamber; and
   (d) an electrolyte solution comprising a molten salt solvent comprising at least one anion selected from the group consisting of bis bis(perfluoroethylsulfonyl)imide and tris(trifluoromethylsulfonyl)methide; at least one reductant soluble in said molten salt solvent, said reductant comprising at least one phenazine; and at least one oxidant soluble in said molten salt solvent, said oxidant having the chemical formula [A][B]$_2$ wherein B is selected from the group consisting of bis(perfluoroethylsulfonyl)imide and tris(trifluoromethylsulfonyl)methide and wherein A is a dication having the structural formula

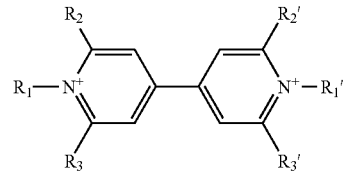

wherein $R_1$ and $R_{1'}$ are independently selected from alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

wherein $R_2$, $R_{2'}$, $R_3$ and $R_{3'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, trifluoromethyl-substituted aryl having 7-20 carbons;

or wherein A is a dication having the structural formula

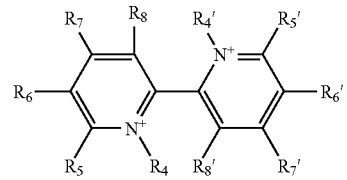

wherein $R_4$ and $R_{4'}$ are independently selected from alkyl having 1-20 carbons; wherein $R_5$, $R_{5'}$, $R_6$, $R_{6'}$, $R_7$, $R_{7'}$, $R_8$, and $R_{8'}$ are independently selected from hydrogen, alkyl having 1-20 carbons, aryl, alkyl-substituted aryl having 7-20 carbons, methoxy-substituted aryl having 7-20 carbons, nitro-substituted aryl having 6-20 carbons, cyano-substituted aryl having 7-20 carbons, tnfluoromethyl-substituted aryl having 7-20 carbons.

2. The electrochemical device of claim 1, wherein A is a dication having the structural formula

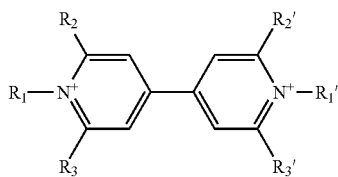

wherein $R_1'$ is alkyl having 1 to 9 carbons or trimethylphenyl or methoxyphenyl and $R_1$ is alkyl having 1 to 9 carbons and $R_2=R_2'=R_3=R_3'$=hydrogen; wherein $R_1=R_1'$=m-xylyl and $R_2=R_2'=R_3=R_3'$=hydrogen; wherein $R_1$ is phenyl and $R_1'$ is alkyl substituted aryl having 18 carbons and $R_2=R_2'=R_3=R_3'$=hydrogen; wherein $R_1=R_1'$=methyl and $R_2$ is alkyl substituted aryl having 8 or 9 carbons or alkyl having 6 carbons and $R_2'$, $R_3$, and $R_3'$ independently selected from the group consisting of hydrogen, alkyl having from 1 to 9 carbons, and alkyl substituted aryl having from 7-20 carbons.

3. The electrochemical device of claim 1, wherein $R_2=R_2'=R_3=R_3'$=hydrogen and wherein $R_1$ and $R_{1'}$ are independently selected from alkyl having 1-9 carbons, aryl, and alkyl-substituted aryl having 7-20 carbons.

4. The electrochemical device of claim 1, wherein $R_2=R_2'=R_3=R_3'$=hydrogen and wherein $R_1=R_1'$ and are selected from the group consisting of alkyl having 1-9 carbons, aryl, and alkyl-substituted aryl having 7-20 carbons.

5. The electrochemical device of claim 1, wherein $R_2=R_2'=R_3=R_3'$=hydrogen and wherein $R_1=R_1'$ and are selected from methyl and benzyl.

6. The electrochemical device of claim 1, wherein said phenazine is selected from the group consisting of N,N,N',N'-tetramethyl-p-phenylenediamine, 2,5,10-trimethyl-3-phenyl-5,10-dihydrophenazine, 5-ethyl-10-methyl-5,10-dihydrophenazine, 5,10-dimethyl-5,10-dihydrobenzo(A)phenazine, 2,7-diphenoxy-5,10-dimethyl-5,10dihydrophenazine, 2-phenoxy-5,10-dimethyl-5,10-dihydrophenazine, 2,7-bis(o-tolyl)-5,10-dimethyl-5,10-dihydrophenazine, 2,3-dimethyl-7-trifluoromethyl-5,10-diethyl-5,10-dihydrophenazine, 5,10-dimethyl-5,10-dihydrophenazine, 2,3-diphenyl-5,10-dimethyl-5,10-dihydrophenazine, 2,7-diphenyl-5,10-dimethyl-5,10-dihydrophenazine, 2-vinyl-5,10-dimethyl-5,10-dihydrophenazine, 2-phenyl-5,10-dimethyl-5,10-dihydrophenazine, 5,10-diisopropyl-5,10-dihydrophenazine, 5,10-dimethyl-5,10-dihydrodibenzo(A,C)phenazine, 1,5,10-trimethyl-2-phenyl-5,10-dihydrophenazin, 2,3,5,10-tetramethyl-7-trifluoromethyl-5,10-dihydrophenazine, and 2,3,5,10-tetramethyl-5,10-dihydrobenzo(B)phenazine.

7. The electrochemical device of claim 1, wherein said electrolyte solution does not include chloride anion, bromide anion, iodide anion, perchlorate anion, tetrafluoroborate anion, tetraphenylborate, carboxylate anion, carbonate anion, hexafluorophosphate anion, or hexafluoroantimonate anion.

8. The electrochemical device of claim 1, wherein said molten salt comprises cations selected from the group consisting of ammonium cations.

9. The electrochemical device of claim 8, wherein said quaternary ammonium cations comprise pyridinium, pyridazinium, pyrimidinium, pyrazinium, imidazolium, pyrazolium, thiazolium, oxazolium, triazolium, tetraalkylammonium cations, or N-methyl morpholinium cations, or mixtures thereof.

10. The electrochemical device of claim 9, wherein said quaternary ammonium cations have the formula $(CH_3CH_2)_3N(R_{24})$, wherein $R_{24}$ is alkyl having 2-10 carbons; or having the formula $(CH_3)_2(CH_3CHCH_3)N(R_{25})$, wherein $R_{25}$ is alkyl having 2-10 carbons: or having the structural formula

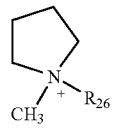

wherein $R_{26}$ is alkyl having 2-10 carbons; or having the structural formula

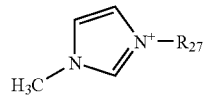

wherein $R_{27}$ is alkyl having 2-10 carbons.

* * * * *